(12) United States Patent
Carlson et al.

(10) Patent No.: US 8,439,020 B1
(45) Date of Patent: May 14, 2013

(54) CVT DRIVEN SUPERCHARGER WITH SELECTIVELY POSITIONABLE SPEED MULTIPLYING GEAR SET

(75) Inventors: Michael A. Carlson, Overland Park, KS (US); Kenneth C. Jones, Kansas City, MO (US)

(73) Assignee: Accessible Technologies, Inc., Lenexa, KS (US)

( * ) Notice: Subject to any disclaimer, the term of this patent is extended or adjusted under 35 U.S.C. 154(b) by 522 days.

(21) Appl. No.: 12/712,957

(22) Filed: Feb. 25, 2010

Related U.S. Application Data

(60) Provisional application No. 61/155,385, filed on Feb. 25, 2009.

(51) Int. Cl.
*F02B 33/00* (2006.01)
*F16H 57/04* (2010.01)

(52) U.S. Cl.
USPC ............ 123/559.1; 123/559.3; 474/93

(58) Field of Classification Search .... 123/559.1–559.3; 474/93
See application file for complete search history.

(56) References Cited

U.S. PATENT DOCUMENTS

| | | | |
|---|---|---|---|
| 4,060,012 A | 11/1977 | Giacosa | |
| 4,671,782 A * | 6/1987 | Ochiai et al. | 474/93 |
| 4,697,665 A * | 10/1987 | Eastman et al. | 474/93 |
| 4,875,454 A | 10/1989 | Okimoto et al. | |
| 5,060,622 A * | 10/1991 | Suzuki | 123/559.1 |
| 5,133,325 A | 7/1992 | Winkelmann | |
| 5,314,385 A | 5/1994 | Haley et al. | |
| 5,361,744 A | 11/1994 | Teraoka | |
| 5,362,219 A | 11/1994 | Paul et al. | |
| 5,394,853 A | 3/1995 | Teraoka | |
| 5,443,054 A | 8/1995 | Tateno et al. | |
| 5,462,035 A | 10/1995 | Teraoka et al. | |
| 5,545,101 A | 8/1996 | Kawase et al. | |
| 5,591,100 A * | 1/1997 | Hayashi et al. | 474/18 |
| 5,848,949 A | 12/1998 | Miyata et al. | |
| 5,931,756 A | 8/1999 | Ohsono et al. | |
| 6,017,285 A | 1/2000 | Yasuhara et al. | |
| 6,082,340 A * | 7/2000 | Heimark | 123/559.1 |
| 6,176,796 B1 | 1/2001 | Lislegard | |
| 6,478,469 B1 | 11/2002 | Jones | |

(Continued)

FOREIGN PATENT DOCUMENTS

| | | |
|---|---|---|
| GB | 2144814 | 3/1985 |
| JP | 62-147167 | 1/1987 |
| JP | 4331858 | 11/1992 |
| JP | 2003-287110 | 10/2003 |

*Primary Examiner* — Thai Ba Trieu
(74) *Attorney, Agent, or Firm* — Erickson, Kernell, Derusseau & Kleypas, LLC

(57) ABSTRACT

A supercharger assembly includes a dry-running CVT coupled to a speed multiplying gear set, which is in turn coupled to a centrifugal supercharger. The CVT includes a CVT housing which has an opening formed therein to provide access to a face of the driven pulley, and a plurality of equally spaced bolt receivers arranged in a circle around the opening. The gear assembly includes a gear housing formed separate from the CVT housing. The gear housing has a plurality of bolt holes formed in it which are arranged in a circle and alignable with respective ones of the bolt receivers. The gear housing is selectively rotatable relative to the CVT housing by moving each of the bolt holes from alignment with a first respective one of the bolt receivers and into alignment with a second respective one of the bolt receivers and then installing fasteners therein.

14 Claims, 13 Drawing Sheets

U.S. PATENT DOCUMENTS

| | | |
|---|---|---|
| 6,612,747 B1 | 9/2003 | Jones |
| 6,651,633 B1 | 11/2003 | Jones |
| 6,718,955 B1 * | 4/2004 | Knight ................ 123/559.1 |
| 6,868,932 B1 | 3/2005 | Davis et al. |
| 7,055,507 B2 | 6/2006 | Kelley, Jr. |
| 7,478,629 B2 * | 1/2009 | del Valle Bravo et al. . 123/559.1 |
| 2002/0004437 A1 | 1/2002 | Asayama et al. |
| 2002/0022542 A1 | 2/2002 | Pfleger et al. |
| 2003/0029664 A1 | 2/2003 | Shimizu |
| 2004/0082421 A1 | 4/2004 | Wafzig |
| 2004/0102267 A1 | 5/2004 | Murakami et al. |
| 2004/0247461 A1 * | 12/2004 | Pflueger et al. ............. 417/407 |
| 2005/0096164 A1 | 5/2005 | Kim et al. |
| 2005/0172919 A1 * | 8/2005 | Ozaki et al. .............. 123/559.1 |
| 2006/0027192 A1 | 2/2006 | Tsukada et al. |
| 2006/0032225 A1 | 2/2006 | Dyne et al. |
| 2006/0270503 A1 | 11/2006 | Suzuki et al. |
| 2009/0312145 A1 | 12/2009 | Pohl et al. |
| 2010/0031935 A1 * | 2/2010 | VanDyne et al. ......... 123/559.1 |
| 2012/0055729 A1 * | 3/2012 | Bessho et al. ............... 180/309 |

* cited by examiner

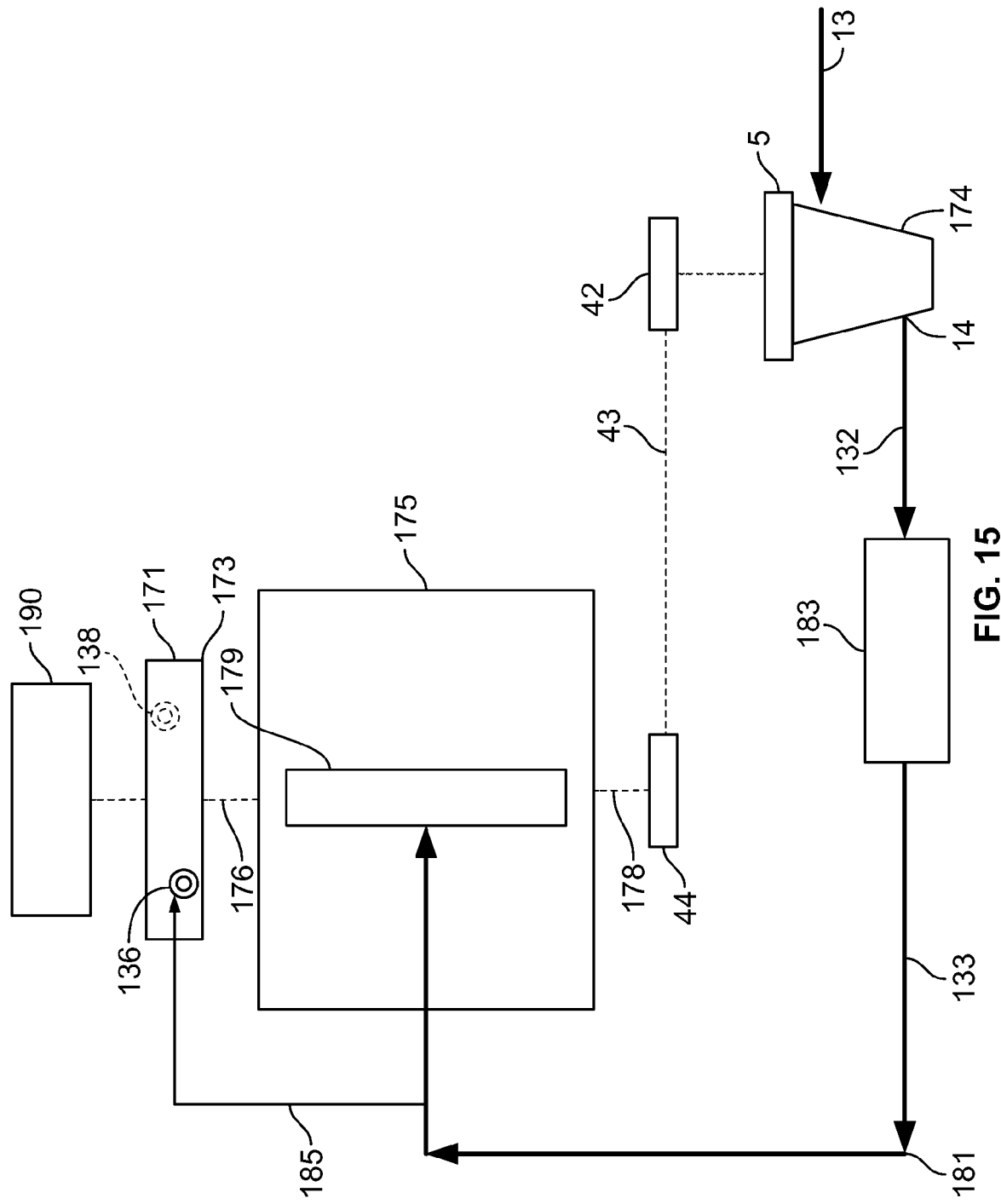

CVT DRIVEN SUPERCHARGER WITH SELECTIVELY POSITIONABLE SPEED MULTIPLYING GEAR SET

This application claims the benefit of provisional application Ser. No. 61/155,385 filed Feb. 25, 2009.

BACKGROUND OF THE INVENTION

1. Field of the Invention

This invention relates to automotive supercharger systems wherein a centrifugal supercharger is driven through a continuously variable transmission ("CVT"), and in particular to such a supercharger system having a speed multiplying gear assembly between the CVT and the supercharger wherein a housing of the gear assembly is selectively rotatably positionable relative to a housing of the CVT.

2. Description of the Related Art

Continuously variable transmissions, which are commonly referred to as CVTs, are used to improve fuel efficiency or horsepower utilization by allowing the drive shaft to maintain a constant angular velocity over a range of output velocities in the form of vehicle speed or angular velocity of a driven component such as a rotary compressor or supercharger. Alternatively, a CVT driven by a drive shaft of variable angular velocity may be used to precisely maintain or control the output angular velocity of the CVT output shaft. Compared with traditional gear-type transmissions having a distinct number of gear ratios, the unlimited number of gear ratios of a CVT allows the user to select a desired drive shaft angular velocity to control a desired output such as efficiency, power output, or speed. It has long been recognized in the automotive market that use of a CVT to drive a supercharger could provide significant performance enhancement. Although existing patents disclose use of a CVT with a supercharger, we are not aware of any commercial applications.

Conventional belt-driven CVTs typically comprise a variable diameter drive pulley with an input shaft, a variable diameter driven pulley with an output shaft, and an endless V-belt wrapped between the drive pulley and the driven pulley. Each pulley comprises a pair of opposing truncated cones or frustoconical sections defining an angular groove therebetween. Generally, one of the cones moves while the other remains fixed. Moving one cone in relation to the other varies the effective diameter of the pulley within which the CVT belt operates. Consequently, belt speed is a function of the effective diameter of the pulley which is, in turn, a function of the axial position of the cones relative to each other.

CVT belts typically have a profile similar to that of a conventional V-belt. In particular, they have a cross-section approximating an isosceles trapezoid; the upper edge being broader than the lower edge. The CVT belts are designed to fit between the opposing cones of the variable diameter pulleys as described above. Additionally, in order to avoid belt slippage while transferring torque from the drive pulley to the driven pulley, the cones of the driven pulley are biased axially inwardly to squeeze against the sidewalls of the CVT belt.

CVT belts have been designed to operate in wet or dry running conditions. Wet CVTs require or utilize liquid lubrication between the CVT belt and the pulley surface. As a result of this required lubrication, the orientation of wet CVTs is constrained by the need to properly distribute lubrication in the CVT housing. Dry running CVTs do not require a lubricant and therefore are not constrained to a certain orientation.

Because of their relative simplicity and favorable speed control characteristics, CVTs are ideal for driving an centrifugal supercharger in automotive applications. A problem, however, is that superchargers run at much higher rotational speeds than CVTs are capable of generating. A speed multiplying or overdrive gear unit is therefore needed between the driven pulley of the CVT and the supercharger.

Previous attempts have been made to drive an automotive supercharger through a CVT. For example, Teraoka et al., U.S. Pat. No. 5,361,744 discloses a supercharging device for an internal combustion engine which utilizes a CVT to control the speed of a supercharger impeller. The device includes a planetary gear set which acts to increase the rotational speed of the impeller over the output speed of the CVT.

Planetary gear sets are well known devices for reducing or multiplying rotational speed. These devices include a rotatably mounted sun gear, a plurality of rotatably mounted planet gears in toothed contact with the sun gear, and a ring gear surrounding and in toothed contact with the planet gears. In speed multiplying applications, the output of the planetary gear set is typically a shaft connected to the sun gear. The input of the planetary gear set may be made either through rotating the ring gear, or by rotating a planet gear carrier to which the planet gears are rotatably mounted.

A primary concern in installing automotive supercharger systems is the lack of available mounting space under the hood of a car. A supercharger system incorporating both a CVT and a gear assembly for increasing the output speed of the CVT is by necessity larger than conventional centrifugal supercharger systems and, therefore, needs to be as compact as possible and should be mountable in various orientations to make use of available space.

Since a dry-running CVT is mountable in various orientations, the only limitation on mounting orientation for such a supercharger system is the gear assembly, which needs to be internally lubricated. Internally lubricated gear assemblies typically have a required mounting orientation which is dictated by the locations of various features of the lubricating system, such as inlet ports, outlet ports, vents, drains, internal oil passages, etc.

What is needed is a compact CVT driven supercharger system having a gear assembly which is adjustably mounted or selectively moveable relative to the CVT such that the system can be adapted to make use of available under-hood space in a variety of vehicle applications.

SUMMARY OF THE INVENTION

A supercharger assembly is disclosed which includes a dry-running CVT coupled to a speed multiplying gear set, which is in turn coupled to a centrifugal supercharger. The CVT includes a drive pulley and a driven pulley connected by a belt, which are housed within a CVT housing. The CVT housing has an opening formed therein to provide access to a face of the driven pulley, and a plurality of equally spaced bolt receivers arranged in a circle around the opening.

The gear assembly is housed within a gear housing formed separate from the CVT housing. The gear housing has a plurality of bolt holes formed in it which are arranged in a circle and alignable with respective ones of the bolt receivers in the CVT housing. A plurality of fasteners are each receivable through a respective one of the bolt holes into a respective one of the bolt receivers. The gear housing is selectively rotatable relative to the CVT housing by moving each of the bolt holes from alignment with a first respective one of the bolt receivers and into alignment with a second respective one of the bolt receivers and then installing the fasteners. The selective rotatability of the gear housing allows the gear assembly to be installed in a required mounting orientation (which may be dictated by lubrication requirements) irrespective of the orientation of the CVT.

BRIEF DESCRIPTION OF THE DRAWINGS

FIG. 15 is a schematic view of an alternative embodiment of the compressed air delivery system.

DETAILED DESCRIPTION OF THE PREFERRED EMBODIMENTS

Figure 1:
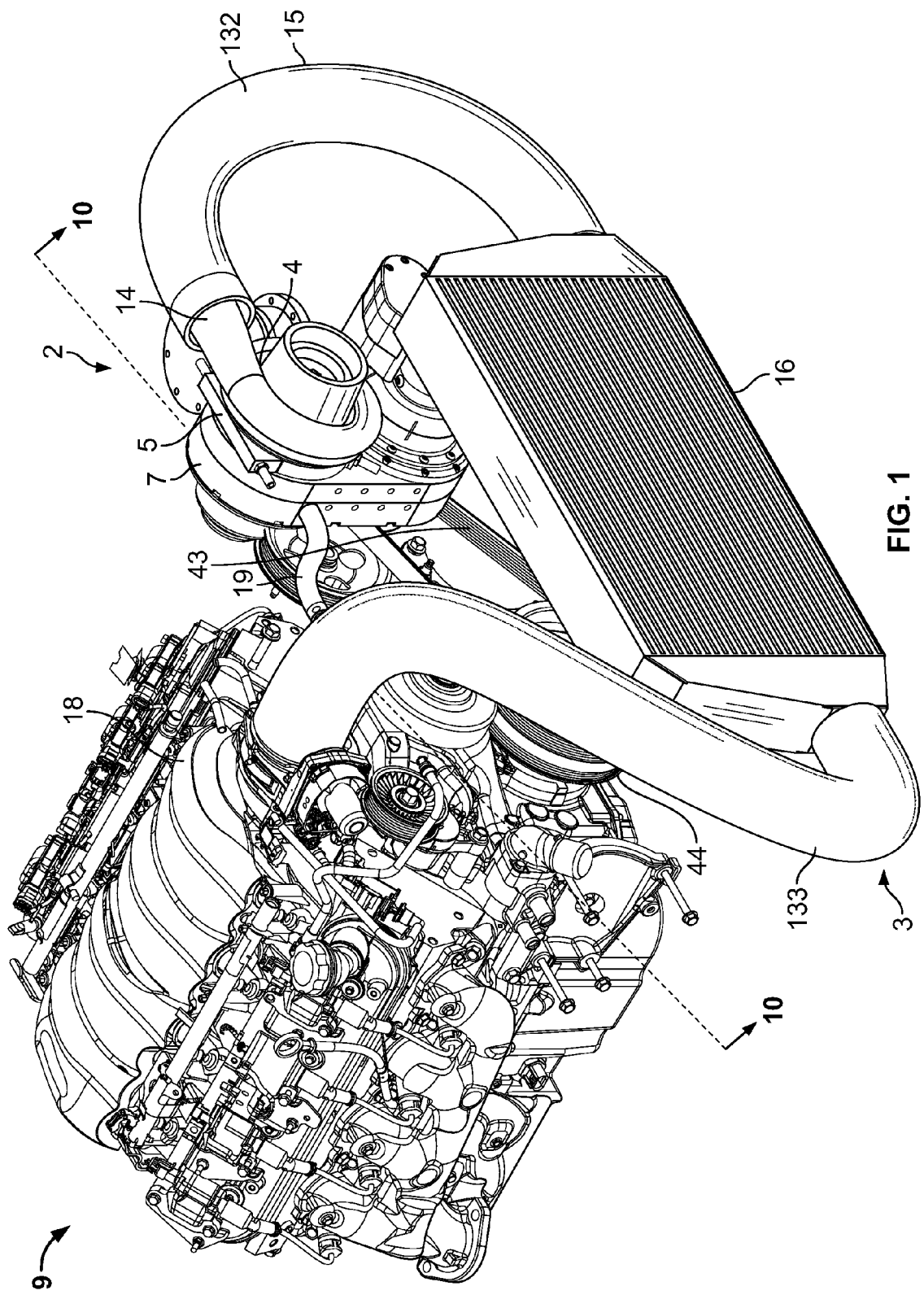
FIG. 1 is a perspective view of a compressed air delivery system for an engine having a compressor assembly including a supercharger driven by a continuous variable transmission (CVT) and a planetary gear assembly in which a belt for the CVT is cooled by a bleed stream off of the supercharger discharge.
Figure 2:
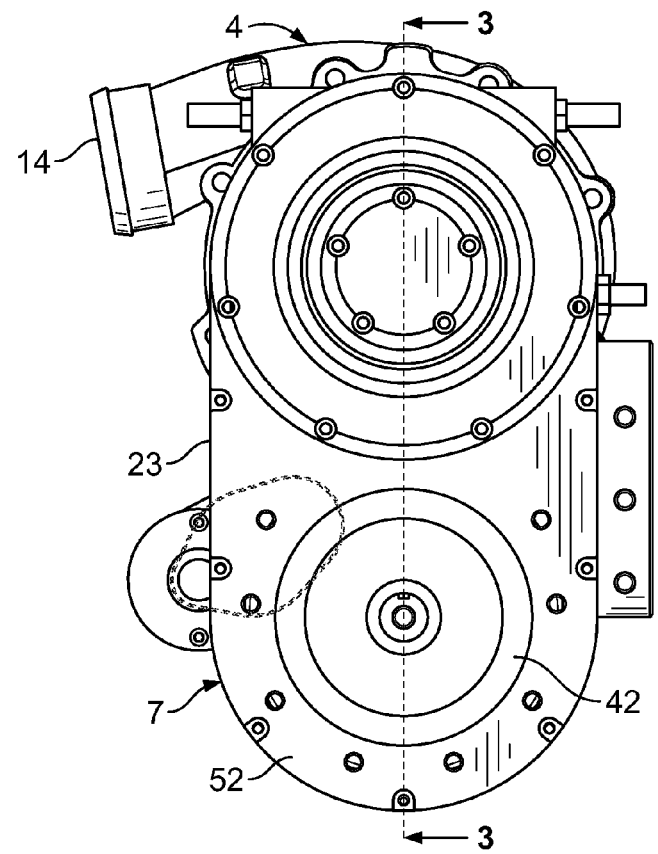
FIG. 2 is a rear, elevational view of the compressor assembly of the compressed air delivery system.
Figure 7:
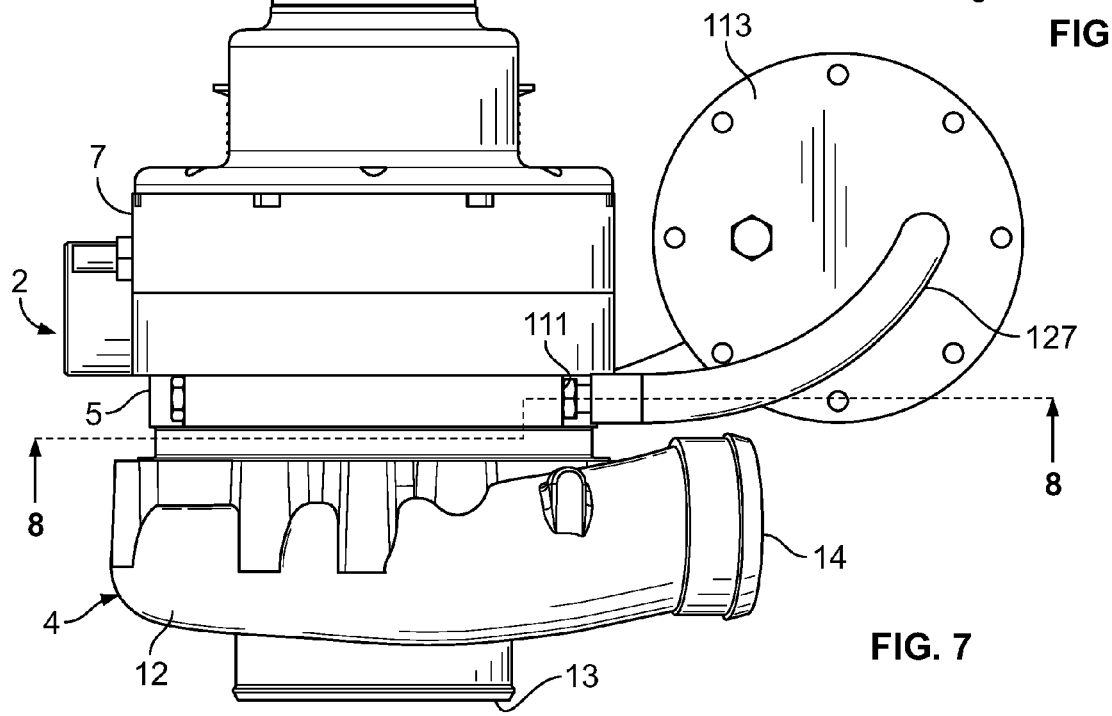
FIG. 7 is an enlarged, top plan view of the compressor assembly showing a lubricant reservoir attached thereto.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Certain terminology will be used in the following description for convenience in reference only and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

It is to be understood that while certain forms of the present invention have been illustrated and described herein, it is not to be limited to the specific forms or arrangement of parts described and shown. As used in the claims, identification of an element with an indefinite article "a" or "an" or the phrase "at least one" is intended to cover any device assembly including one or more of the elements at issue. Similarly, references to first and second elements is not intended to limit the claims to such assemblies including only two of the elements, but rather is intended to cover two or more of the elements at issue. Only where limiting language such as "a single" or "only one" is used with reference to an element is the language intended to be limited to one of the elements specified, or any other similarly limited number of elements.

Referring now to FIGS. 1-10 in more detail, there is shown an embodiment of a compressed air delivery system 1 including a compressor assembly 2 and a compressed air discharge assembly 3. The compressor 2 assembly generally comprises a rotary compressor or supercharger 4 operably coupled to speed multiplying gear assembly 5, such as a planetary gear assembly, which is operably coupled to a continuously variable transmission or CVT 7. Engine 9 drives the CVT 7 which controls the angular velocity of the supercharger 4.

The supercharger includes an impeller 11 rotatably mounted within a supercharger housing or volute 12 which is driven by the CVT 7 at relatively high angular velocities to compress air pulled into the supercharger housing 12 through suction inlet 13 which is then discharged under pressure through outlet 14. Compressed air discharged from the supercharger outlet 14 flows through a discharge conduit 15, through an intercooler 16 and to an engine air manifold 18 for delivering pressurized air to the engine 9 to be used in engine combustion to increase engine performance. A bleed line or CVT cooling hose 19 branches off of the discharge conduit 15, downstream of the intercooler 16 and is connected to the CVT 7 for supplying cooling air thereto.

The function and operation of CVTs are well-known in the prior art. As with the embodiment shown in FIG. 1, CVTs may be used in vehicles to control the speed of a supercharger. CVTs may also be used in industrial applications to control the speed of an air compressor for supplying pressurized air to process equipment including for example pneumatic conveying systems.

Figure 3:
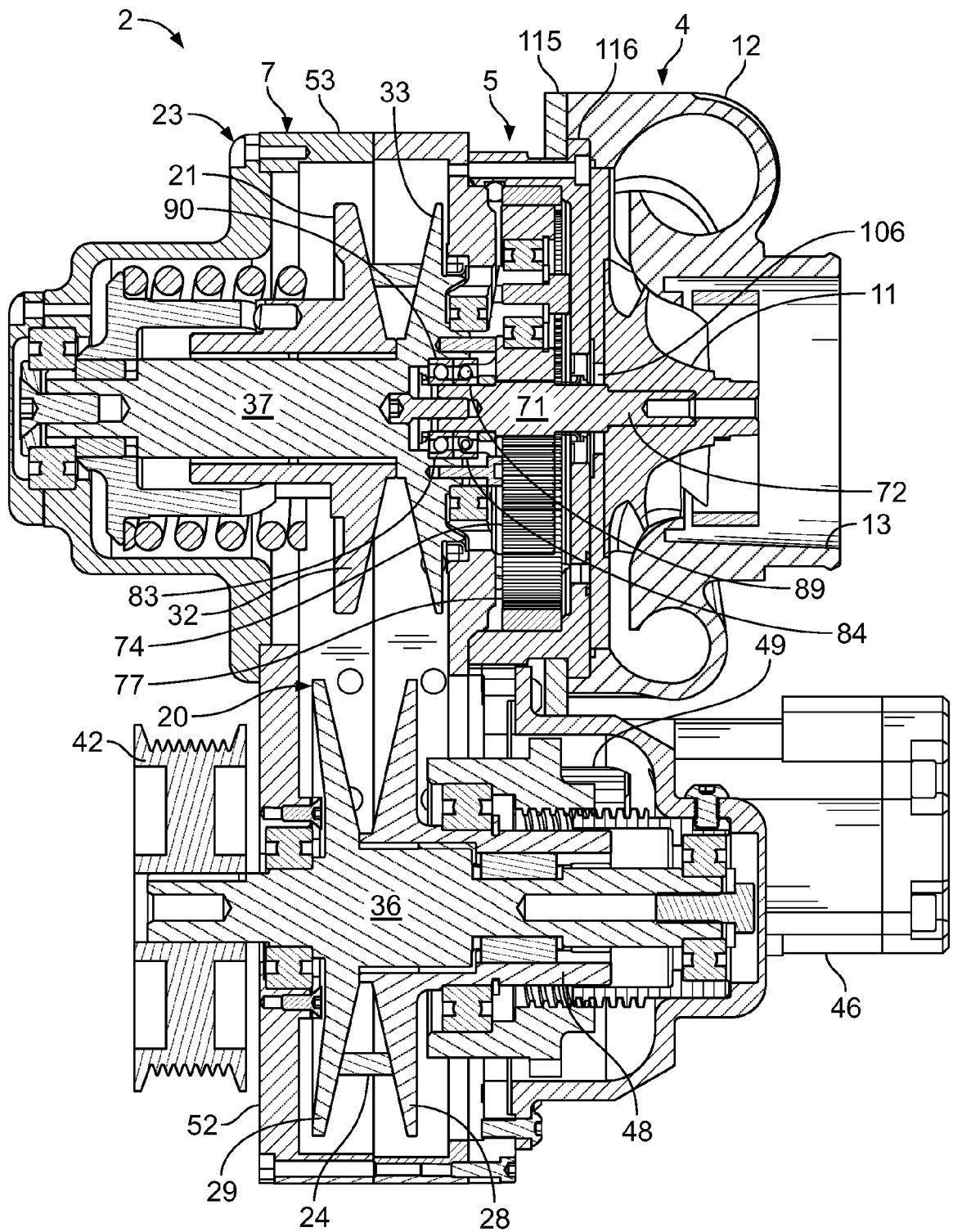
FIG. 3 is an enlarged cross-sectional view of the compressor assembly taken along line 3-3 of FIG. 2.
Figure 4:
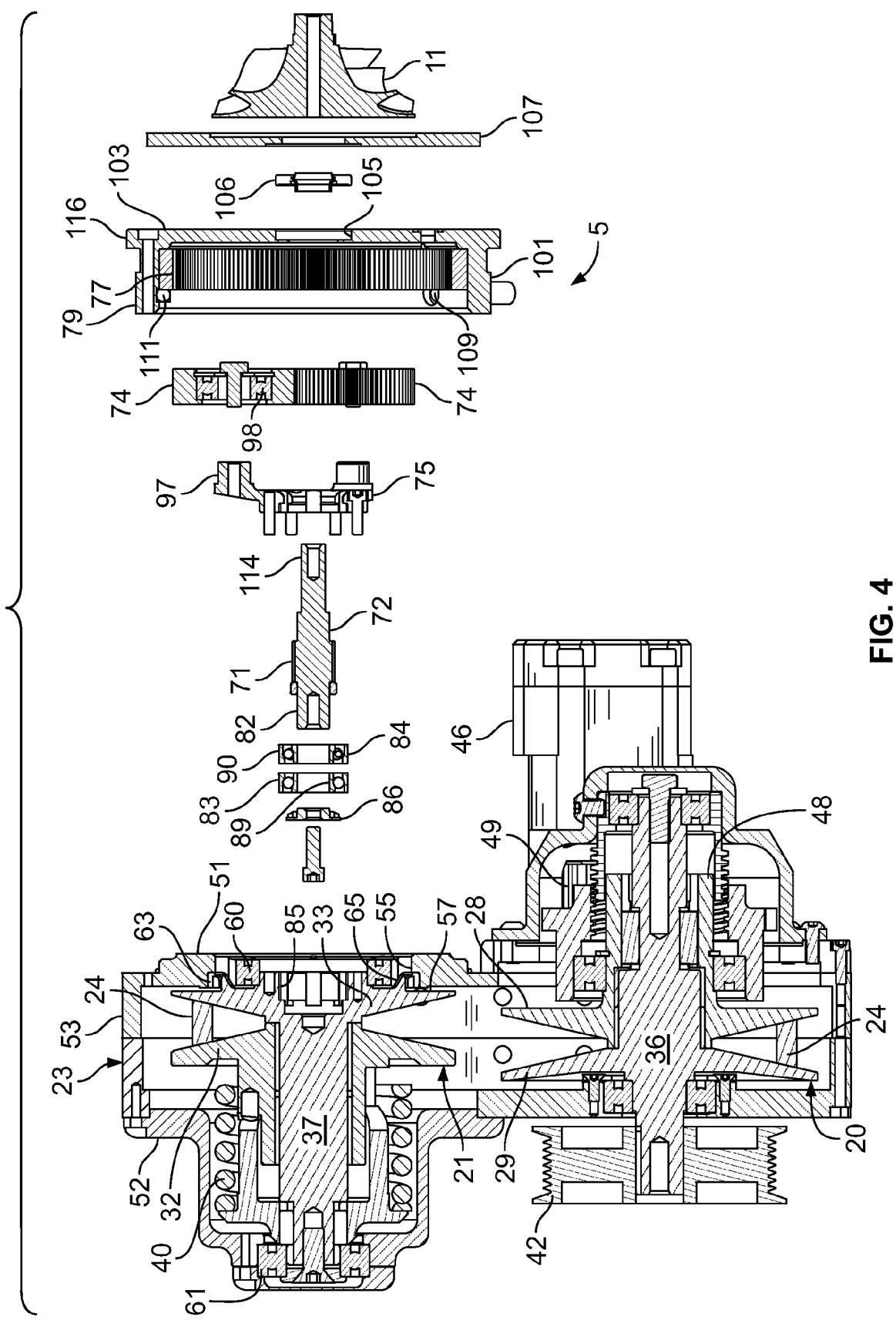
FIG. 4 is an enlarged and partially exploded cross-sectional view of the compressor assembly, similar to the cross-section of FIG. 4 and with a supercharger volute removed.
Figure 5:
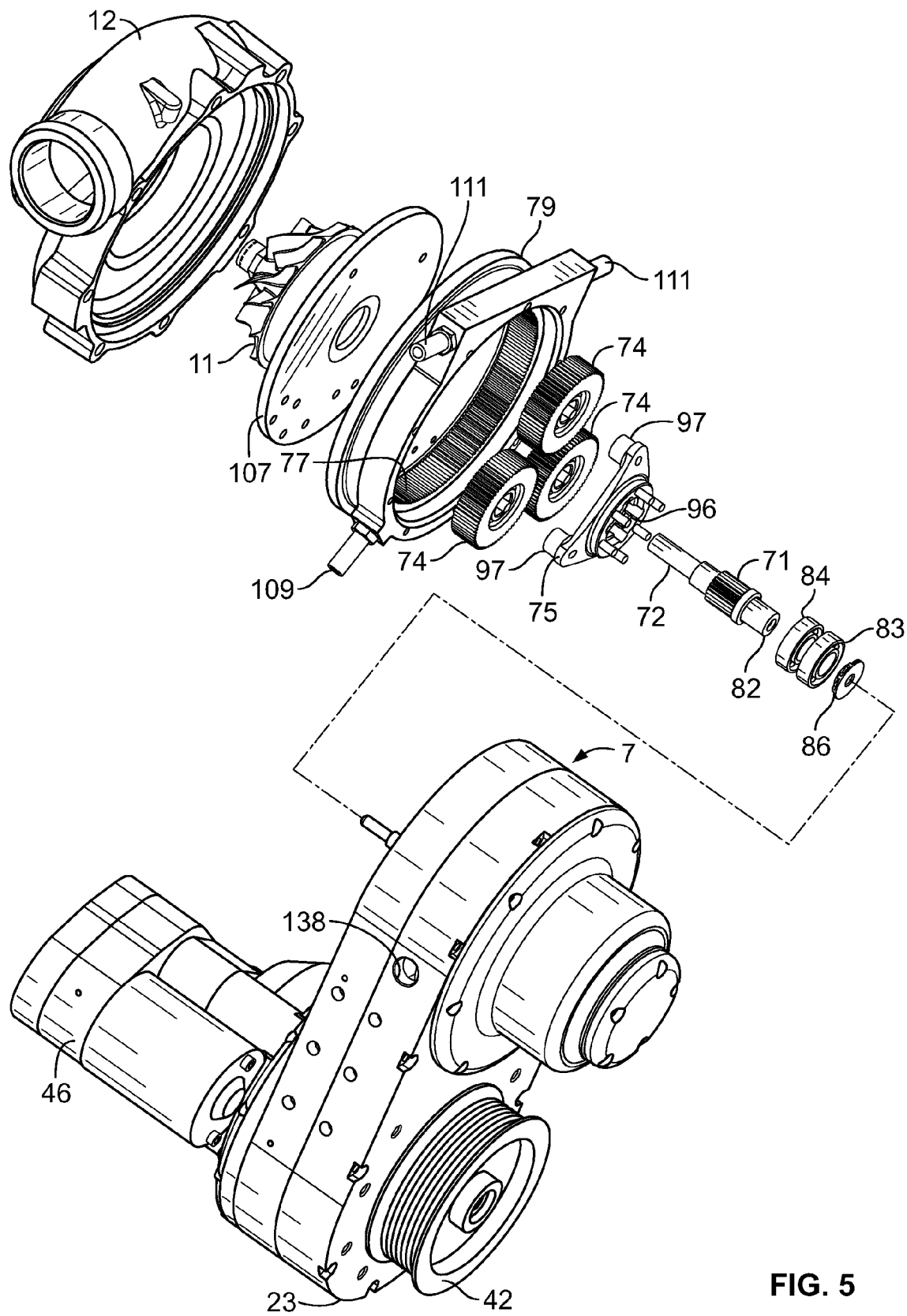
FIG. 5 an exploded, rear perspective view of the compressor assembly as shown in FIGS. 2-4.

FIGS. 3-5 show the basic components of a dry-running CVT 7 having variable diameter pulleys 20 and 21 positioned within a CVT housing 23 and interconnected by a CVT belt 24. In the embodiment shown, pulley 20 may be referred to as an internal CVT drive pulley and pulley 21 as an internal CVT driven pulley. Each pulley includes a pair of opposingly facing, truncated cones or frustoconical sections 28 and 29 for the drive pulley 20 and cones 32 and 33 for the driven pulley 21. The cones define an angular groove therebetween within which the CVT belt 24 rides. One of the cones 28 and 32 on each pulley 20 and 21 respectively is axially movable on a pulley shaft 36 and 37 and may be referred to as the moveable cone 28 and 32. The other cone 29 and 33 on each pulley 20 and 21 respectively is fixed to or integrally formed with the pulley shaft 36 and 37 respectively so that it rotates therewith. The cones 29 and 33 may be referred to as shaft cones. Moveable cone 32 of driven pulley 21 is biased axially towards shaft cone by a spring 40 acting on the axially movable cone 32.

A portion of pulley shaft 36 for internal drive pulley 20 extends past shaft cone 29 and through the CVT housing 23.

Figure 11:
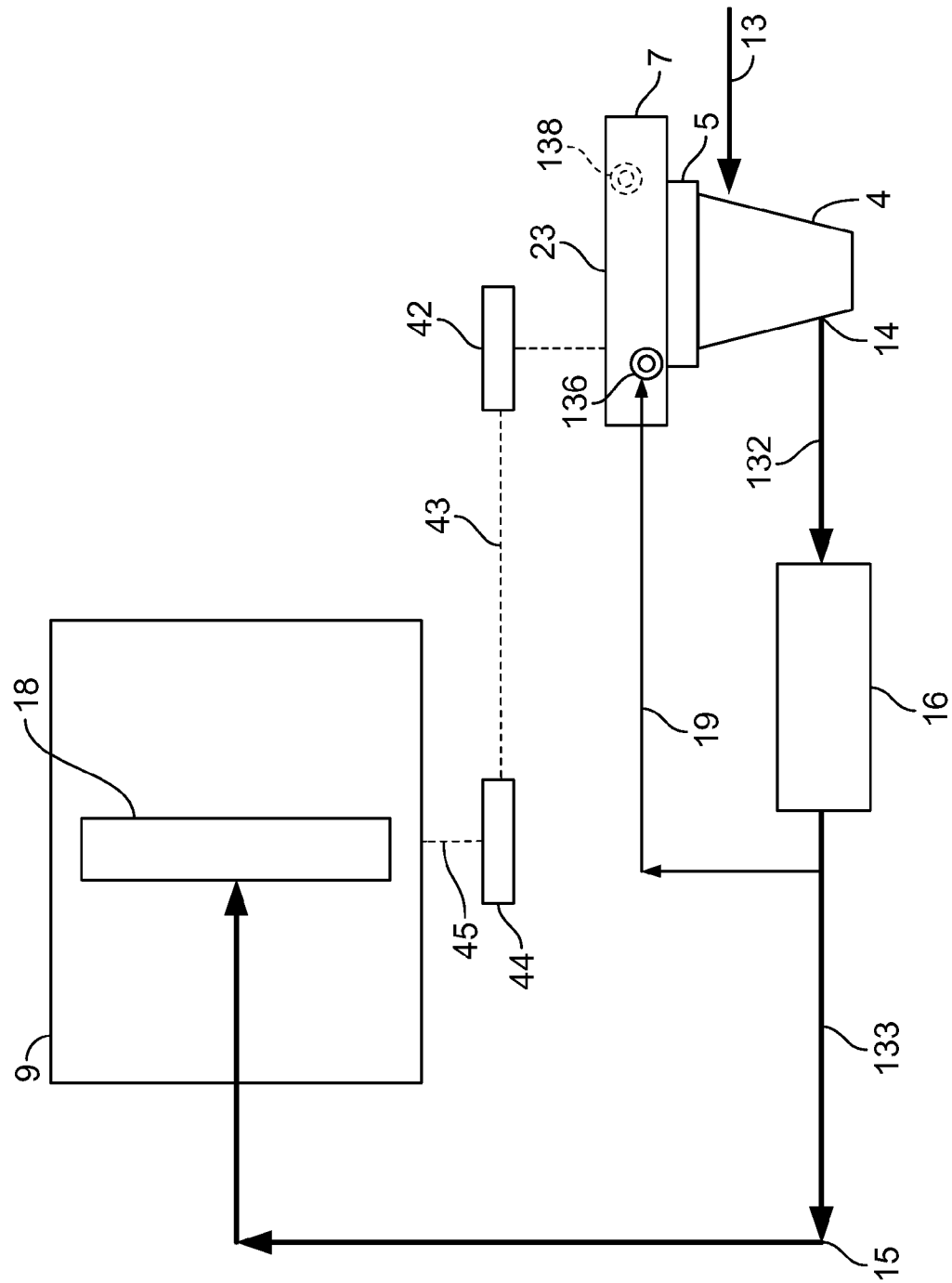
FIG. 11 is a schematic view of the compressed air delivery system as shown in FIG. 1.

An external pulley 42 is fixedly mounted on the pulley shaft 36 externally of the CVT housing 23 and connected to and driven by a belt 43 connected to an engine drive pulley 44 mounted on the crankshaft 45 of the engine 9 as shown in FIG. 1 and schematically in FIG. 11

The axial position of the movable cone 28 on the CVT drive pulley 20 is controlled by an electric motor 46. The moveable cone 28 is mounted on or projects radially outward from a generally cylindrical hub 48 which is externally threaded. The hub 48 is slidingly mounted over the CVT drive pulley shaft 36 which is connected to stationary cone 29. A gear assembly 49 (not shown in detail) driven by electric motor 46 and engaging threaded hub 48 is operable to move or slide the moveable cone 28 along shaft 36 and towards or away from the stationary cone 29. An electronic controller, not shown, operates the electric motor 46 to control the position of the movable cone 28 relative to the stationary cone 29 according to a desired angular velocity of the CVT driven pulley output based on engine speed, thrust, air manifold pressure or other measured variables.

As the axial distance between the cones 28 and 29 on CVT drive pulley 20 is decreased, the effective diameter of the pulley 29 increases causing the CVT belt 24 to move radially outward from the center of the drive pulley 29. Simultaneously, the inwardly urged cones 32 and 33 of the CVT driven pulley 21 are forced axially apart, therefore decreasing the effective diameter of the pulley 21 as the CVT belt 24 moves radially inward towards the center of the driven pulley 21.

As described above, the CVT belt 24 is disposed on the drive pulley 20 and driven pulley 21. The cross-section of the CVT belt 24 forms an approximate isosceles trapezoid with the upper edge broader than the lower edge. The angle of the sidewalls of the CVT belt 24 matches the angular groove formed by the opposing cones 28 and 29 of pulley 20 and cones 32 and 33 of pulley 21. The belt 24 is of the type which may generally be referred to as a V-belt and is preferably a dry-hybrid belt made from rubber or other polymeric material and metal blocks. The CVT belt 24 may also simply be formed of rubber or other polymeric material without metal blocks or components.

The CVT housing 23 generally includes front and rear faces or walls 51 and 52 and a sidewall 53 extending there around. The gear assembly 5 is connected between the CVT driven pulley 21 and the impeller 11 of the supercharger 4 through an opening 55 formed in the front wall 51 of the CVT housing 23. More specifically, the gear assembly 5 is connected to an outwardly facing side 57 of shaft cone 33 of driven pulley 21.

Shaft cone 33 and its integral shaft 37 are rotatably mounted on front and rear bearings 60 and 61 in the housing 23 such that the outwardly facing side 57 of cone 33 is aligned with the opening 55 in housing front face 51. An annular seal, such as lip seal 63, is positioned between and forms a seal between an edge of the housing 23 defining opening 55 and an outwardly projecting rim 65 on the shaft cone 33 of driven pulley 21. Seal 63 is adapted to prevent migration of lubricant from the gear assembly 5 into the CVT housing 23.

The gear assembly 5 is used to increase the angular velocity or speed of rotation of the impeller 11 relative to the CVT driven pulley 21. The gear assembly 5 is shown as being a planetary gear assembly which generally comprises a sun gear 71 formed on an elongate shaft or sun gear shaft 72, three planet gears 74 rotatably mounted on a planet gear carrier 75 and around the sun gear 71, and a ring gear 77 within which the planet gears 74 rotate. A gear housing 79 encloses the gear assembly 5.

A rearward or inner end 82 of sun gear shaft 72 is rotatably supported by bearings 83 and 84 within a recess 85 formed in the outwardly facing side 57 of shaft cone 33 of CVT driven pulley 21. The sun gear shaft 72 is therefore not fixedly connected to shaft cone 33 but freely rotatable relative thereto. The gear assembly 5 causes the sun gear shaft 72 to rotate in the same direction, but at a higher speed or angular velocity relative to shaft cone 33. An impeller or oil pump 86 is bolted onto the inner end 82 of the sun gear shaft 72 to help circulate lubricating oil through the recess 85 and around or through the bearings 83 and 84.

The bearings 83 and 84 each have an inner race 89 and an outer race 90. The outer races 90 rotate with the shaft cone 33 at a first angular velocity. The inner races 89 rotate with the sun gear shaft 72 in the same direction at a second, higher angular velocity. The differential in angular velocities between the inner races 89 and outer races 90 is, therefore, much lower than it would be if the sun gear shaft 72 were journaled to a stationary structure. This results in less wear and longer life for the bearings 83 and 84. It should also be noted that the bearings 83 and 84 are installed back-to-back such that thrust loads on the sun gear shaft 72 in either axial direction can be absorbed without causing catastrophic damage to either of the bearings 83 and 84.

The planet gear carrier 75 is annular, with a central bore 96. The planet gear carrier 75 is bolted onto the outwardly facing side 57 of shaft cone 33 with sun gear shaft 72 extending through the carrier bore 96. A rearward portion of the planet gear carrier 75 extends into the front bearing 60 and is supported thereby. The planet gear carrier also acts as a cap to retain bearings 83 and 84 in the recess 85. Three cylindrical studs or stub axles 97 are formed on and project outward from the carrier 75 away from the shaft cone 33. The stub axles 97 are equally spaced around the central bore 96 of the carrier 75.

A planet gear 74 is rotatably mounted on each stub axle 97 with a planet gear bearing 98 positioned between the planet gear 74 and the stub axle 97. The planet gears 74 are spaced equally radially outward from the center of the carrier 75 and around the sun gear 71. Each planet gear 74 mates with each adjacent planet gear 74 and with the sun gear 71. The ring gear 77 extends around all three planet gears 74 and mates with each planet gear 74 on a side opposite the sun gear 71. In the embodiment shown, the ring gear 77 is fixedly secured and restrained from rotating within the gear housing 79.

The gear housing 79 includes a housing sidewall 101 and an outer end wall 103 and is bolted to the CVT housing 30 around the gear assembly 5. An opening 105 is centrally formed in the outer end wall 103 of the gear housing 79 through which the sun gear shaft 72 extends. An annular seal, such as lip seal 106 extends around the sun gear shaft 72 between the shaft 72 and the outer end wall 103 to seal opening 105. A seal retaining plate 107 with a hole extending therethrough to receive sun gear shaft 72 is mounted to the outer end wall 103 of gear housing 79 to hold the seal 106 in place. One or more lubricant inlet ports 109 and lubricant outlet ports 111 are formed in the housing sidewall 101 for supplying lubricant to the gear assembly 5 from a lubricant reservoir 113.

The planet gear carrier 75, fixedly attached to the shaft cone 33 of CVT driven pulley 21, rotates at the same angular velocity as the CVT driven pulley 21 and provides the input to the gear assembly 5. In the preferred embodiment. As the carrier 75 rotates in a first direction, for example clockwise, the planet gears 74 move clockwise around the ring gear 77. The intermeshing of the planet gears 74 with ring gear 77 causes the planet gears 74 to then rotate counter-clockwise on their stub axles 97. Counter-clockwise rotation of the planet gears 74 about axles 97 causes the sun gear 71 and sun gear axle 52 and attached impeller 11 to rotate clockwise providing the output for the planet gear assembly 5. The gear ratios between the planet gears 74 and the sun gear 71 cause the sun gear 71, sun gear shaft 72 and impeller 11 to rotate at a higher angular velocity than the CVT driven pulley 21. The gear assembly 5 may be modified to achieve various gear ratios depending on the desired range of output angular velocities.

The supercharger impeller 11 is press fit and bolted onto an outer end 114 of the sun gear shaft 72. The supercharger housing 12 is bolted to one or more clamp members 115 which engage an annular flange 116 extending radially outward from the gear housing side wall 101 proximate the front or end wall 103 thereof. The clamping action of the clamp members 115 acting against the annular flange 116 acts to retain the supercharger housing 12 on the gear assembly 5. Rotation of the impeller 11 pulls air through the suction inlet 13 and discharges the air under pressure through the housing outlet 14.

In automotive supercharger applications, under-hood space for mounting the compressor assembly 2 is often severely limited. It is therefore advantageous that the CVT 7 of the present invention is a dry running CVT which has no internal lubrication and can be mounted in any convenient orientation to make use of available space. The gear assembly 5, however, is internally lubricated and therefore has a required orientation. For example, the gear assembly 5 as shown has at least one lubricant outlet port 111 which needs to be oriented in a top or upward position and at least one inlet port 109 which needs to be oriented in a bottom or downward orientation. Other internal lubrication ports or channels of the gear assembly 5 may also require a specific orientation for proper lubrication. It is a feature of the present invention, therefore, that the gear assembly 5 is selectively rotatably mounted relative to the CVT 7 such that the gear assembly 5 can be kept in its required angular orientation, no matter the orientation of the CVT 7.

Figure 6:
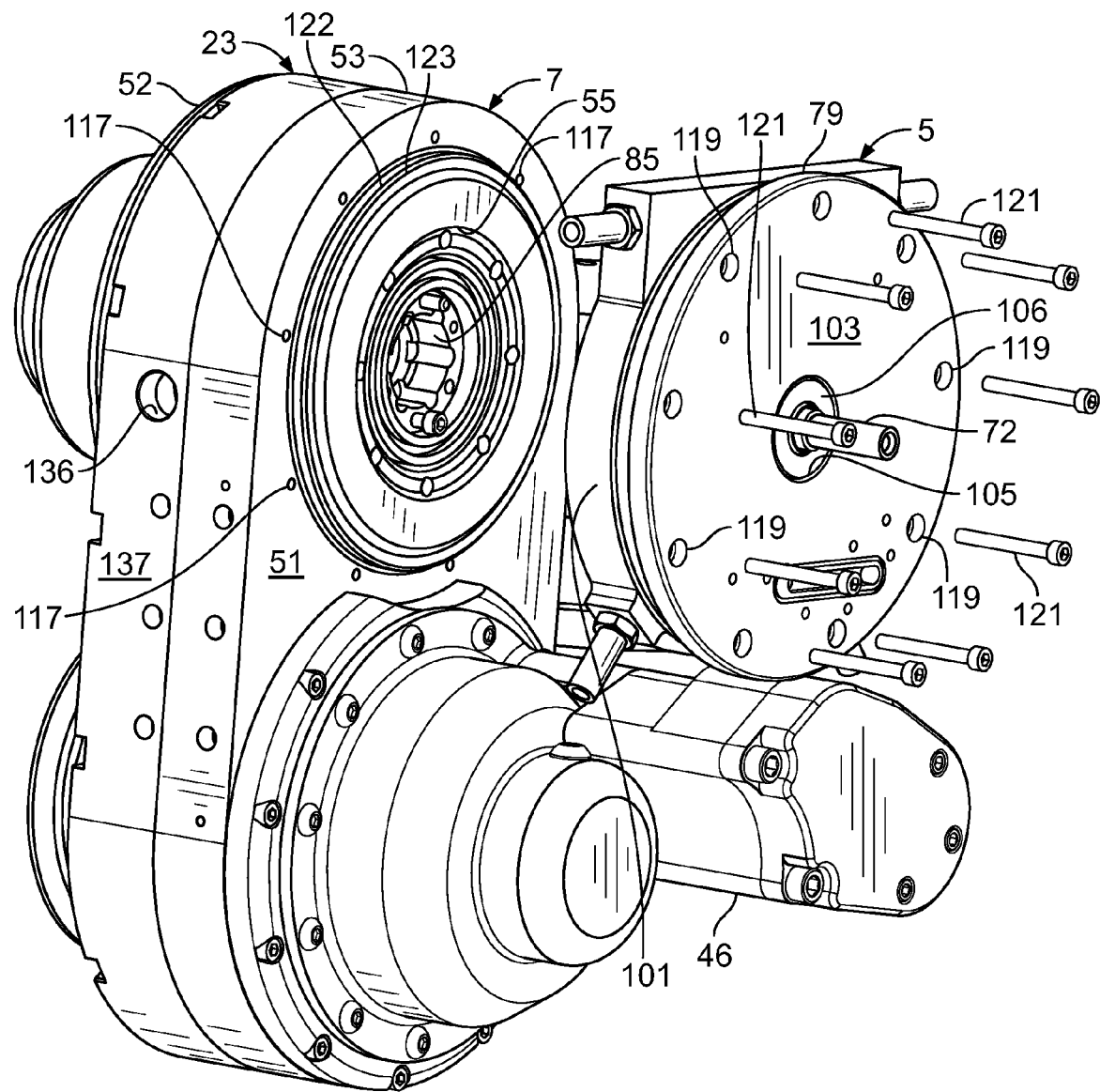
FIG. 6 is an exploded, front perspective view of the planetary gear assembly and the CVT.

Referring to FIG. 6, the CVT 7 is shown as having a plurality of bolt receivers 117 formed in the CVT front wall 51 in a circle around the opening 55 and centered on the recess 85 formed in the outwardly facing side 57 of shaft cone 33 of CVT driven pulley 21. The bolt receivers 117 are equally angularly spaced apart from one another. A corresponding set of bolt holes 119 are formed through the gear housing 79 and extend longitudinally through the side wall 101 thereof. The bolt holes 119 are arranged in a circle equal in diameter to the circle of the bolt receivers 117. Threaded fasteners 121, such as cap crews, are each simultaneously received through one of the bolt holes 119 and into a respective one of the bolt receivers 117 to fasten the gear assembly 5 to the CVT 7. The outer or forward ends of the bolt holes 119 are preferably counterbored to receive the heads of the cap screws 121.

The front wall 51 of the CVT 7 includes an outwardly extending cylindrical flange 122 which is received inside the annular side wall 101 of the gear housing 79. An O-ring seal 123 is positioned on the cylindrical flange 118 to seal against the side wall 101 and prevent lubricating oil from leaking out of the gear assembly 5.

The gear assembly 5 is installed on the CVT by first inserting the sun gear shaft 72, with bearings 83 and 84, and the oil pump 86 attached, into the recess 85 in the shaft cone 33. The planet gear carrier 75 is then bolted to the shaft cone 33 and the planet gears 74 installed. The gear housing 79 (with installed ring gear 77) can then be installed by aligning the bolt holes 119 with selected ones of the bolt receivers 117 and installing the cap screws 121.

Figure 8:
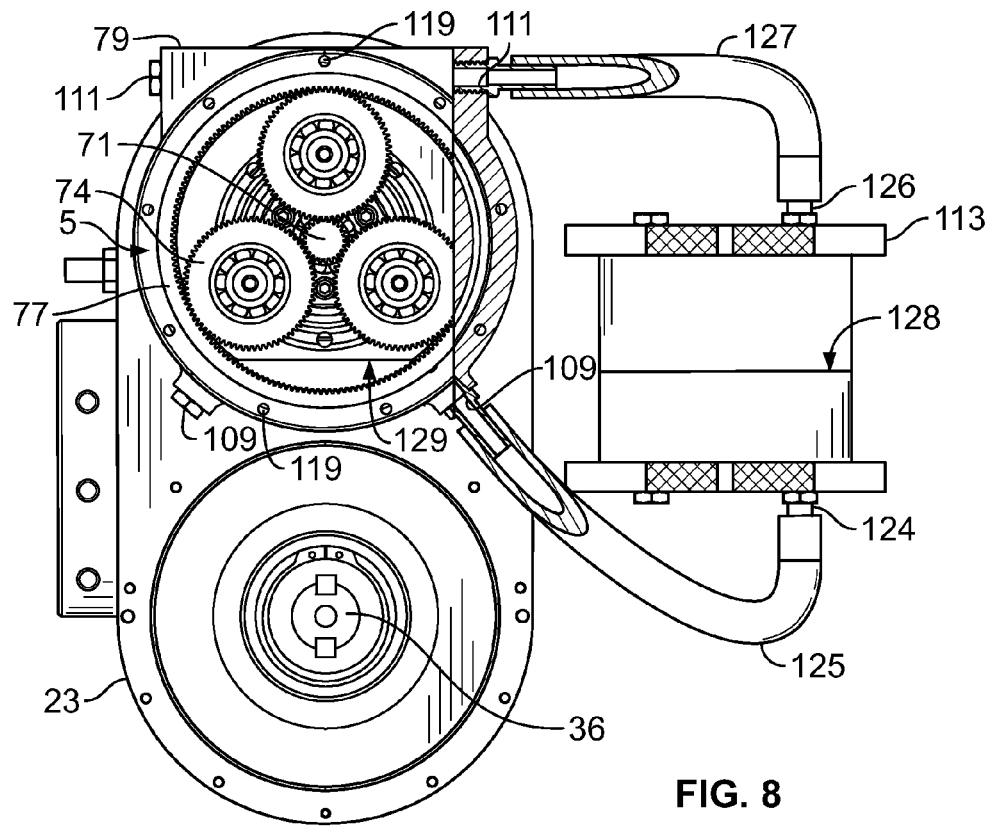
FIG. 8 is a cross-sectional view, taken generally along line 8-8 of FIG. 7 showing the CVT housing in a first angular orientation relative to the planetary gear assembly and housing.

FIG. 8 shows CVT 7 in a generally vertical orientation with the sun gear shaft 72 directly above the drive pulley shaft 36. The gear housing 79 is mounted to the CVT 7 with the outlet ports 111 properly positioned at the top of the housing 79. The left hand outlet port 111 has been blocked with a plug. Similarly, the inlet ports 109 are positioned at the bottom of the housing 79 and the left inlet hand port 109 has been blocked. The bolt holes 119 are each aligned with respective ones of the bolt receivers 117 (not shown).

Figure 9:
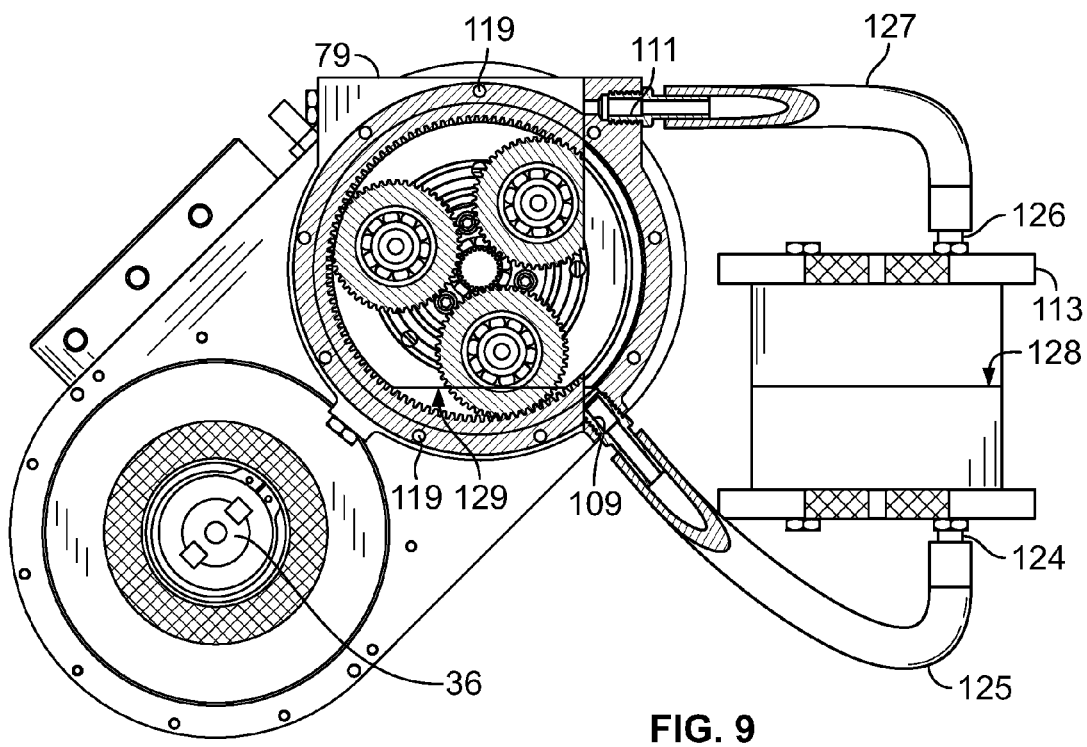
FIG. 9 is a cross-sectional view, similar to FIG. 8 showing the CVT housing in a second angular orientation relative to the planetary gear assembly and housing.

In the installation of FIG. 9, the CVT 7 is canted forty degrees to the right about the axis extending through shaft 36 of drive pulley 20. The orientation of the gear housing 79 relative to the CVT housing 23 is angularly adjusted so that it remains in its proper upright position due to the housing 79 being rotated counterclockwise such that the bolt holes 119 are offset one bolt receiver 117 from their position in FIG. 8. It should be noted that the compressor assembly 1 is shown in each of the figures as including nine bolt receivers 117 in the CVT front wall 51 and nine bolt holes 119 in the gear housing 79 for receiving nine cap screws 121. The angular displacement between each hole is, therefore, forty degrees and the gear housing 79 can thus be rotated relative to the CVT 7 in forty degree increments. It is foreseen, however that more or fewer of the bolt receivers 117, bolt holes 119 and fasteners 121 could be used, so long as the bolt holes 119 are alignable with respective ones of the bolt receivers 117. If more than nine bolt receivers 117, bolt holes 119 and fasteners 121 are used, the increments in which the gear housing 79 could be adjusted relative to the CVT 7 would be smaller. If fewer were used, the increments would be larger. It is also foreseen that the number of bolt receivers 117 could be a multiple of the number of bolt holes 119 such that the gear housing 79 could be selectively rotated in fractions of increments. For example, if there were nine bolt holes 119 and eighteen bolt receivers 117, then the gear housing 79 could be selectively rotated in half increments of twenty degrees.

It is also foreseen that the gear housing 79 could be mounted to the CVT 7 so that the angular position of the gear housing 79 relative to the CVT 7 is infinitely adjustable rather than incrementally adjustable. For example, the gear housing 79 could be provided with an annular flange (not shown) similar to the annular flange 116, but extending radially outward from the gear housing side wall 101 proximate its rearward edge. Clamp members (not shown) similar to the clamp members 115 could then bolt to the CVT front wall 51 in position to engage the annular flange and clamp it against the CVT front wall 51. The gear housing 79 could then be rotated to any desired degree by loosening the bolts holding the clamp ring, repositioning the housing 79, and then re-tightening the bolts.

Referring to FIGS. 8 and 9, the oil reservoir 113 is shown as having an outlet port 124 at its lower end which is connected the unblocked inlet port 109 of the gear housing 79 by a lower hose 125. Similarly, the reservoir 113 has an inlet port 126 at its upper end which is connected to the unblocked outlet port 111 of the gear housing 79 by an upper hose 127. Oil is contained within the reservoir 113 at a reservoir oil level 128. The oil reservoir 113 is positioned alongside and on a level with the gear housing 79 such that gravity causes oil to move through the lower hose 125 from the reservoir 113 into the gear housing 79. Oil is therefore in the gear housing 79 at a gearbox oil level 129 which is generally even with the reservoir oil level 128. As the planet gears 74 rotate and orbit about the sun gear 71, oil is moved upwardly and out through the outlet port 111. The oil thus circulates back through the upper hose 127 to the reservoir 113.

Figure 10:
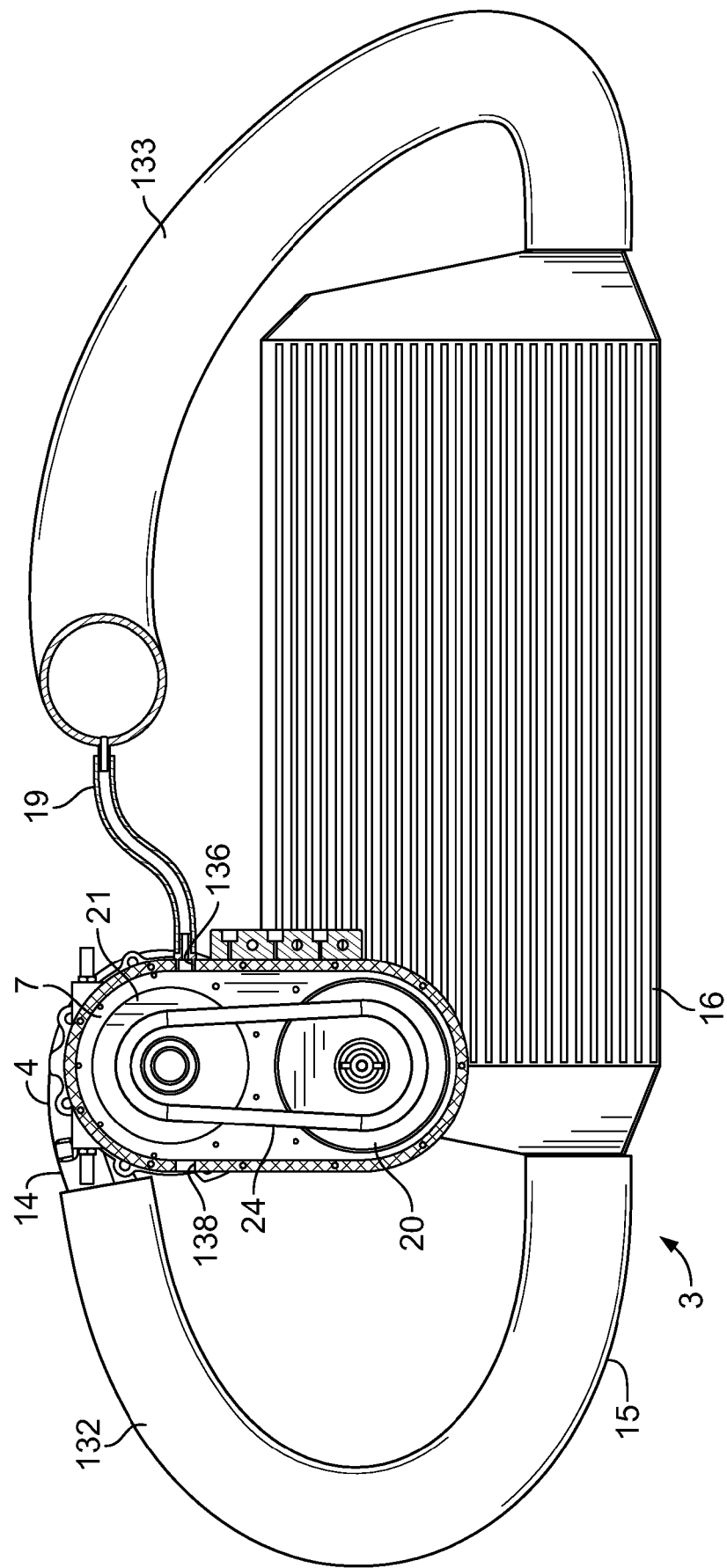
FIG. 10 is an enlarged and fragmentary view taken generally along line 10-10 of FIG. 4 with arrows representing air flow through the CVT housing.

As described previously with reference to FIG. 1 and as shown schematically in FIG. 10, pressurized air discharged from the supercharger 4 flows through discharge conduit 15 to air intake manifold 14 of engine 9. Intercooler 16 positioned on or inline with discharge conduit 15 cools the air discharged from the supercharger before it is delivered to the intake manifold 14. For automotive or vehicle applications, an air to air intercooler, such as intercooler 16 shown in FIG. 1 is suitable for providing the required cooling. It is understood that other types of intercoolers or heat exchangers, including liquid to air heat exchangers could be utilized to cool the air heated by operation of the supercharger or compressor 4 prior to introduction into the engine 9 or for use in other applications.

The discharge conduit 15 may be described as having first and second sections 132 and 133. The first section or hot air discharge conduit 132 extending between the supercharger 4 and the intercooler 16 and the second or cooled air discharge conduit 133 extending between the intercooler 16 and the engine air intake manifold 18. Pressurized air passes through hot air discharge conduit 132, through intercooler 16, through cooled air discharge conduit 133 and to the air intake manifold 18 for engine 9. Preferably, the compressed air or gas stream exiting the intercooler 16 is cooled to within thirty degrees Fahrenheit of ambient temperature.

CVT cooling hose 19 is connected at a first end to the discharge conduit 15 downstream of the intercooler 16. Hose 19 may also be described as being connected at a first end to the cooled air discharge conduit 133. A second end of the CVT cooling hose 19 is connected to the CVT housing 23 through a cooling air inlet or coolant inlet 136 formed in housing 23. In the embodiment shown in FIGS. 1-9, the cooling air inlet 136 is formed in the sidewall 53 of the housing 23. A cooling air outlet or coolant outlet 138 is also formed in the housing sidewall 53 in spaced relation relative to the inlet 136 and generally on opposed sides thereof.

Cooled and compressed air flows through the CVT cooling hose 19, through inlet 136 and into the space enclosed by the CVT housing 23. The cooling air inlet 136 is positioned to direct cooling air entering the CVT housing 23 over or across a portion of the CVT belt 24 to cool the belt 24 during operation of the CVT 7. The cooling air outlet 138 is preferably formed in the sidewall 53 on a side of the pulleys 20 and 21 opposite the cooling air inlet 112 so that rotation of the CVT belt 24 will draw at least a portion of the cooling air with the belt 24 around pulley 20 or 21 before the cooling air is discharged through outlet 138. The cooling air entering through the cooling air inlet 136 displaces hot air in the CVT housing 23. The displaced hot air evacuates the CVT housing 23 through the cooling air outlet 138. In the embodiment shown, the cooling air outlet 138 exhausts the hot air directly to atmosphere or within the engine compartment. However, in other applications it is foreseen that the hot air could be discharged to a waste gas heat exchanger or utilized for other purposes.

In certain applications where the compressor discharge air does not require cooling for the primary application, the heat exchanger or intercooler 16 may be installed on the bleed stream or CVT cooling hose. Such an embodiment might be applicable where it is desired to use the compressed air to heat particulate material conveyed by the pressurized air in a pneumatic conveying system.

Figure 12:
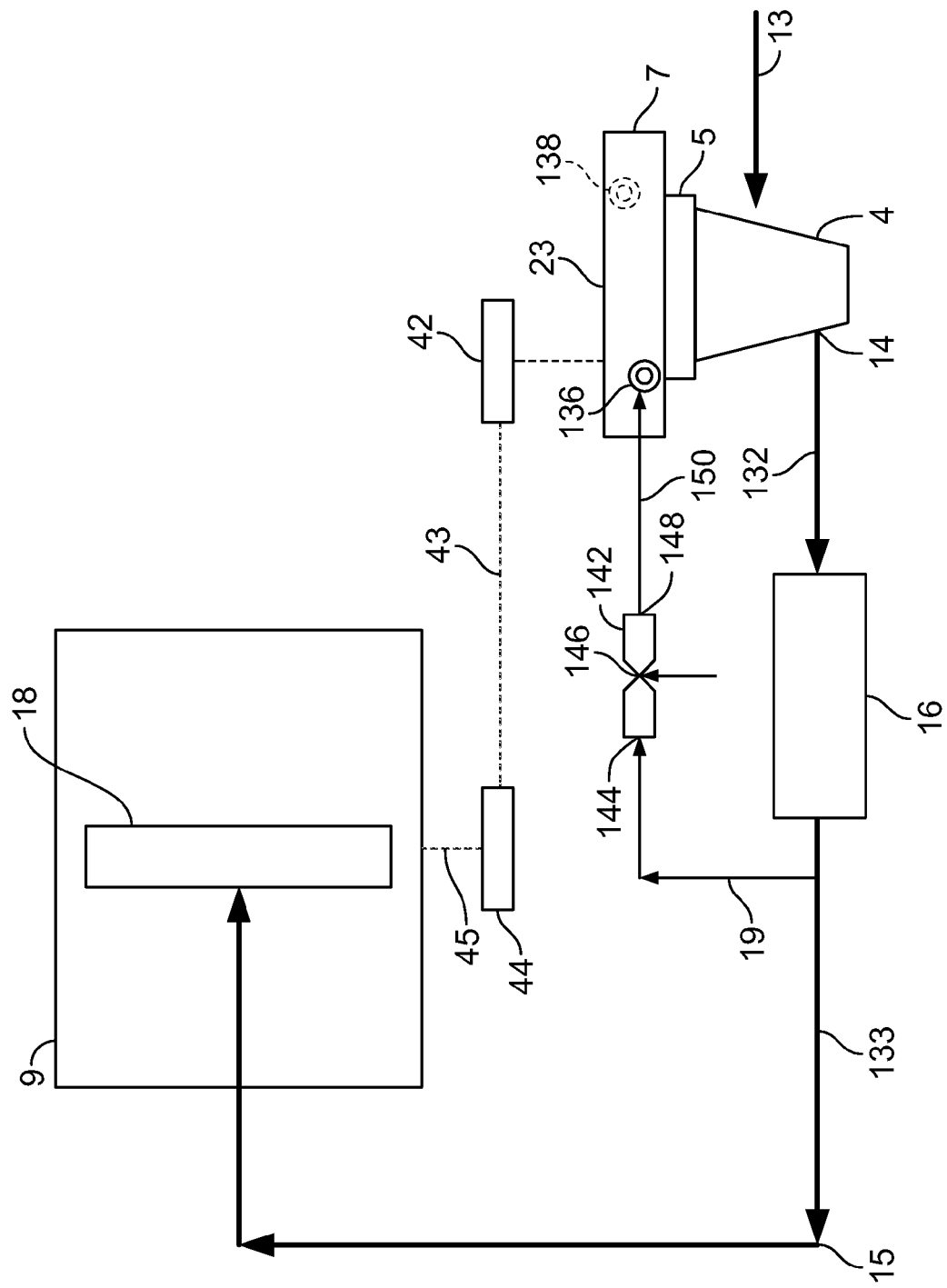
FIG. 12 is a schematic view of an alternative embodiment of the compressed air delivery system.

FIG. 12 is a schematic view of an alternative embodiment of a compressed air delivery system 141 which is adapted for applications where more cooling air is required to cool CVT belt 24. Components that are the same or equivalent to components shown in the first embodiment are numbered similarly. In the compressed air delivery system 141 shown in FIG. 12, an eductor 142 may be used to direct increased cooling air volume into the CVT housing 23. As shown schematically in FIG. 12, the eductor 142 includes a motive fluid inlet 144, an eductor inlet 146, and an eductor outlet 148. The side stream tubing or CVT cooling hose 19, optionally cooled, is connected to the motive fluid inlet 144 of eductor 142 and directs compressed air into the eductor 142, through a restriction and to the eductor outlet 148. Relatively cool, ambient air is drawn into the eductor inlet 146 due to the expansion of the compressed air from the motive fluid inlet 144 after it passes the eductor restriction or nozzle. Suction created by the expansion of the compressed air draws cooling air, generally ambient air, into the eductor 142 through eductor inlet 146. The ambient air drawn in through eductor inlet 146 mixes with the compressed air stream to result in a larger volume of air exiting the eductor outlet 148. The cooling air mixture exits the eductor outlet 148 and flows to the CVT housing inlet 136 though CVT cooling air conduit 150. The cooling air delivered to the CVT housing through cooling air conduit 150 is generally directed across and along the CVT belt 24 to cool the belt 24 and previously heated cooling air is displaced out the CVT housing outlet 138.

Figure 13:
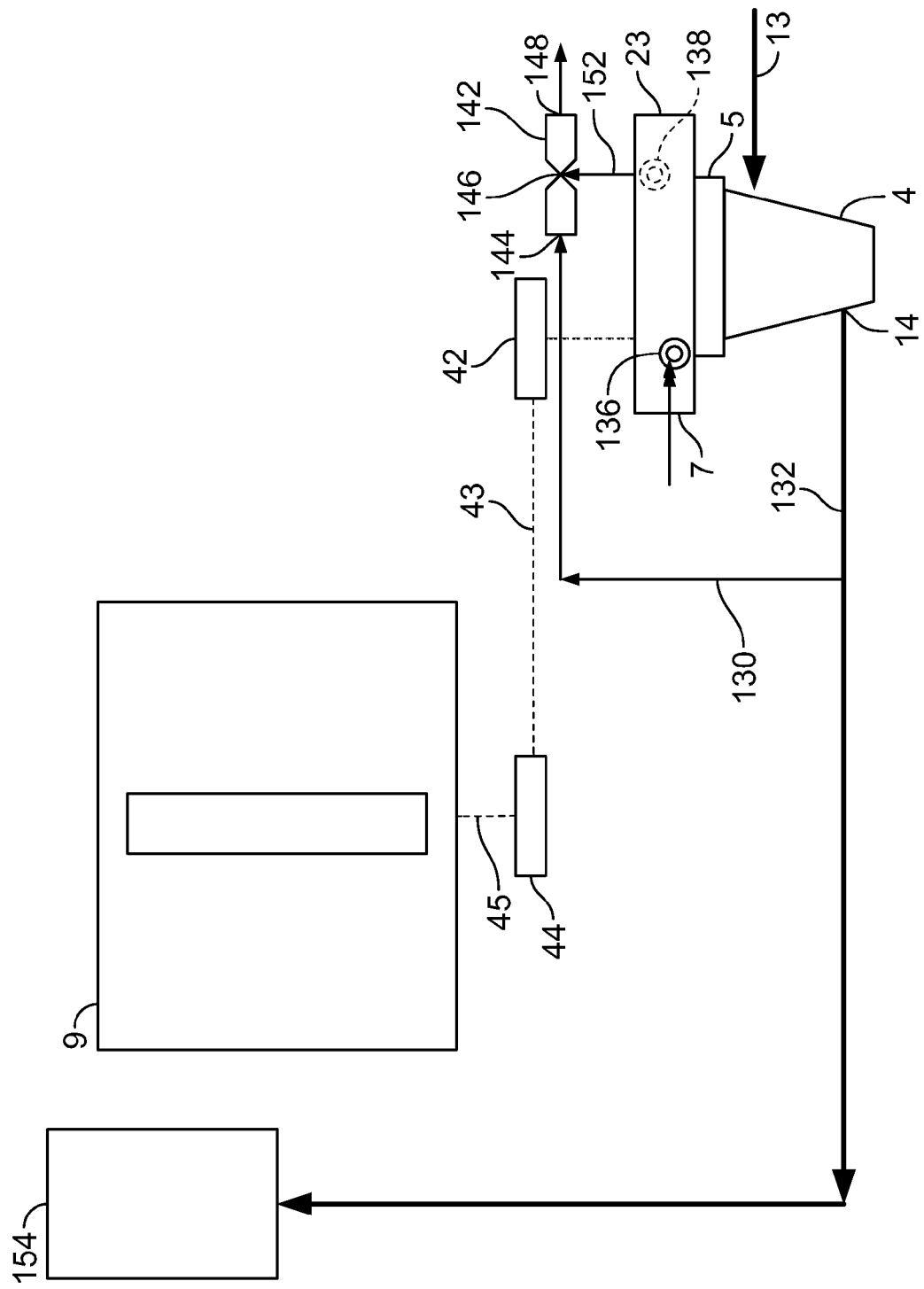
FIG. 13 is a schematic view of an alternative embodiment of the compressed air delivery system.

Alternatively, an eductor may be used to pull hot air out of the CVT housing 23 as shown in the process flow diagram of FIG. 13. Bleed line 130 branching off of the discharge conduit 15 supplies compressed air to the eductor motive fluid inlet to function as the motive fluid. An eductor suction hose or conduit 152 connects the eductor inlet 146 to the CVT housing outlet 138. The suction created by the compressed air passing past the eductor restriction draws hot air out of the CVT housing 23 which creates lower pressure therein to pull relatively cool ambient air into the CVT housing 23 through inlet 136 to cool CVT belt 24. In this embodiment, there generally is no reason to cool the stream of compressed air directed into the motive fluid inlet 144. Therefore, unless the air discharged from supercharger or compressor 4 needs to be cooled for other downstream equipment, then the intercooler can generally be removed. The eductor outlet 148 may be exhausted to atmosphere or to other applications such as waste gas heat recovery. As housing air is pulled from the CVT housing 23, cooling air enters the CVT housing 23 through the CVT housing cooling air inlet 136 to cool the CVT belt 24 or CVT pulleys 20 and 21. FIG. 13 also demonstrates that the compressed air discharged from the compressor 4 may be used in other applications including industrial processing applications or equipment represented schematically by box 154. Such processing equipment or applications may include, for example, pneumatic conveying systems. As used herein, the engine air intake manifold 18 or other processing equipment or structure 154 into which pressurized or compressed air is delivered by the compressed air delivery systems disclosed herein may be referred to as a plenum.

Figure 14:
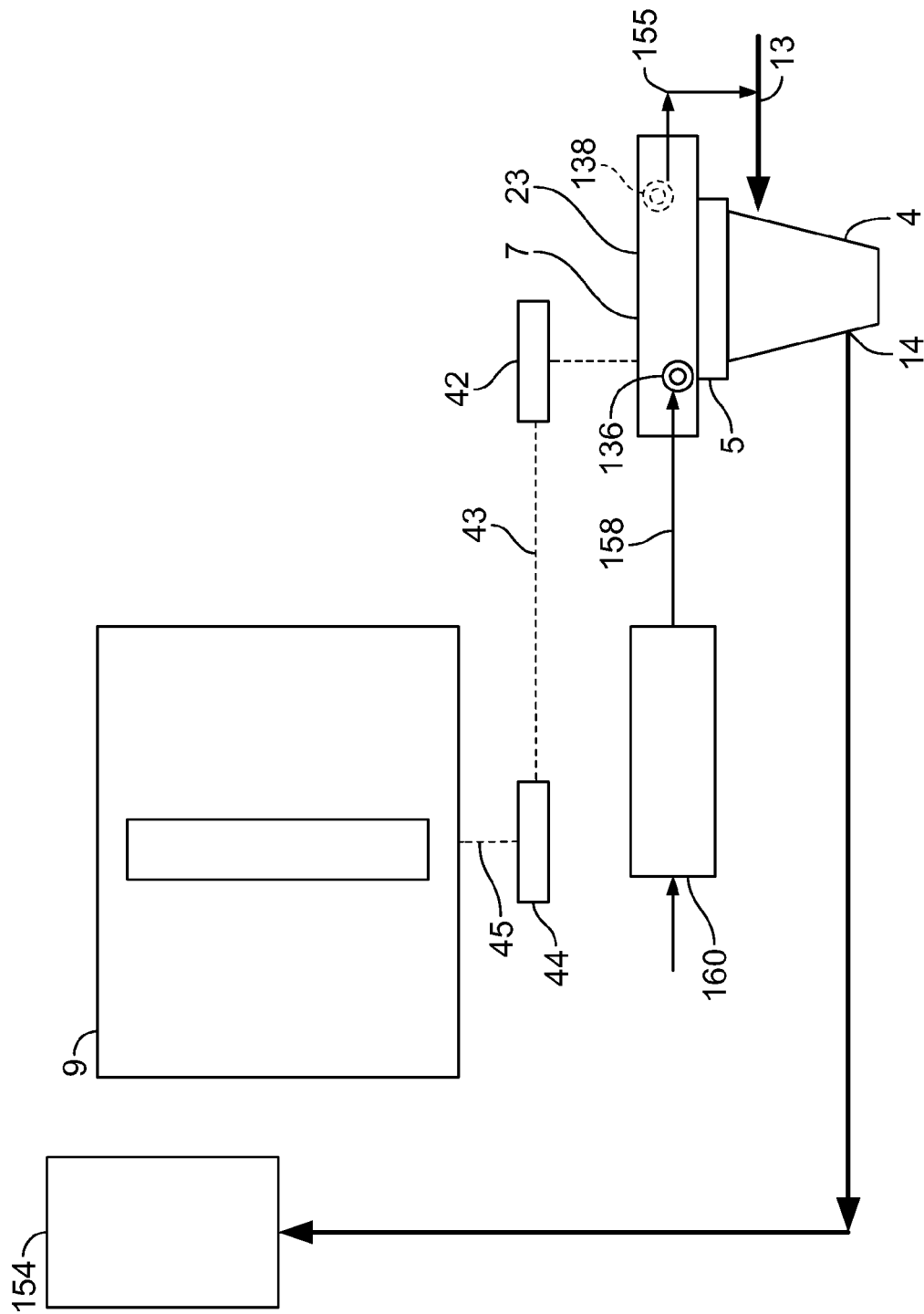
FIG. 14 is a schematic view of an alternative embodiment of the compressed air delivery system.

FIG. 14 shows an additional alternative embodiment in which the CVT housing 23 is cooled by using suction to draw hot air from the housing 23. More specifically, a compressor suction conduit 155 is connected between the suction inlet 13 for compressor 4 and the discharge opening or outlet 138 in the CVT housing 23. In some applications or embodiments, the suction or pressure at the compressor intake 13 approaches a vacuum and is well below the CVT housing 23 pressure. A vacuum condition or sub-CVT housing pressure at the compressor intake 13 will draw heated air out of the CVT housing 23 through its discharge opening 138, through the compressor suction conduit 155 and into the compressor intake 13. As heated air is pulled from the CVT housing 23, ambient cooling air enters the CVT housing 23 through the CVT housing cooling air inlet 136 to cool the CVT belt 24 or CVT pulleys 20 and 21. It is foreseen that a cooling air inlet conduit 158 could be connected to the CVT housing cooling air inlet 136 through which cooling air is drawn. It is also foreseen that the cooling air inlet conduit 158 could pass through a heat exchanger 160 to cool the cooling air drawn into the CVT housing 23.

FIG. 15 shows a further alternative embodiment of a system for cooling a CVT 171. In the embodiment of FIG. 15, the CVT 171 functions as the transmission for the vehicle, such as a snowmobile or universal terrain vehicle. The CVT 171 may incorporate a fan or blower on one of the pulley shafts to circulate air in the CVT housing 173. A supercharger 175 connected to and driven by an output shaft 175 of the engine 176 is used to supply compressed or pressurized air back to an air intake manifold 179 of the engine 176 through a discharge conduit 181. An intercooler 183 may be mounted on the discharge conduit to cool the air supplied to the manifold 179. A bleed line or cooling air hose 185 branches off of the discharge conduit 181 downstream of the intercooler 183 and is connected to the CVT housing 173 to supply cooling air into the CVT housing 173 to cool the CVT belt (not shown) operating therein.

It is foreseen that in an application as shown in FIG. 15, the supercharger supplying air to the engine air intake manifold 179 could be a turbocharger or other exhaust driven type supercharger. Turbochargers use the exhaust gas from an engine to turn a turbine connected to an impeller which compresses air in the compressor volute.

It is foreseen that in certain applications, the CVT may not include a housing. In such applications, cooling air can still be directed onto the CVT belt through a hose such as hose 185 with a nozzle or the like mounted on the end or simply securing the hose end in close proximity to the belt.

As used herein, reference to the power train of a vehicle is intended to include the engine and the other components of the vehicle that are driven by the engine off of its crank shaft or output shaft. The power train would include the transmission and auxiliary systems driven by the engine. Such auxiliary system may include for example a supercharger.

While a preferred embodiment and several alternatives of the present invention have been described, it should be understood that various changes, adaptations and modifications may be made therein without departing from the spirit of the invention and the scope of the appended claims. For example, although the gear assembly 5 has been described and depicted herein as being a planetary gear assembly, it is foreseen that other types of speed multiplying gear assemblies such as bull and pinion gear assemblies may also be used.

What is claimed and desired to be secured by Letters Patent is as follows:

1. A supercharger assembly comprising:
   a) a dry-running CVT including a drive pulley and a driven pulley connected by a belt, said pulleys and said belt contained within a CVT housing;
   b) a centrifugal supercharger having an impeller rotatably mounted within a supercharger housing; and
   c) a gear assembly having an input shaft drivingly coupled to said driven pulley of said CVT, an output shaft drivingly coupled to said impeller of said supercharger, and a gear housing formed separate from said CVT housing; wherein
   d) said gear housing is selectively attachable to said CVT housing in one of a plurality of angular orientations relative thereto.

2. A supercharger assembly comprising:
   a) a dry-running CVT including a drive pulley and a driven pulley connected by a belt, said pulleys and said belt contained within a CVT housing;
   b) a centrifugal supercharger having an impeller rotatably mounted within a supercharger housing;
   c) a gear assembly having an input drivingly coupled to said driven pulley of said CVT, an output drivingly coupled to said impeller of said supercharger, and a gear housing formed separate from said CVT housing; and
   d) mounting means for securing said CVT housing to said gear housing in a selected CVT mounting orientation relative to said gear housing, said selected CVT mounting orientation chosen from a plurality of angularly offset CVT mounting orientations to make use of available space for mounting said CVT.

3. The supercharger assembly as in claim 2 wherein:
   a) said gear assembly has a required mounting orientation; and
   b) said mounting means allows said gear assembly to be mounted in said required mounting orientation when said CVT housing is in said selected CVT mounting orientation.

4. A supercharger assembly comprising:
   a) a dry-running CVT including a drive pulley and a driven pulley connected by a belt, said pulleys and said belt contained within a CVT housing;
   b) a centrifugal supercharger having an impeller rotatably mounted within a supercharger housing;
   c) a planetary gear assembly including a sun gear fixed to a sun gear shaft, a plurality of planet gears rotatably mounted on a rotatable planet gear carrier and a ring gear fixedly mounted within a gear housing formed separate from said CVT housing, said planet gears being in toothed contact with said sun gear and said ring gear; wherein
      i) said planet gear carrier is an input of said gear assembly connected to said driven pulley of said CVT; and
      ii) said sun gear shaft is an output of said gear assembly connected to said supercharger impeller; and
   d) means for selectively rotatably connecting said gear housing to said CVT housing.

5. The supercharger assembly as in claim 4, wherein:
   a) said driven pulley of said CVT has an axial recess formed therein;
   b) an inner end of said sun gear shaft is supported by at least one bearing assembly mounted in said recess in said driven pulley; and
   c) said driven pulley and said sun gear shaft rotate in the same direction.

6. The supercharger assembly as in claim 5 wherein said bearing assembly includes an inner bearing race rotating with said sun gear shaft and an outer bearing race rotating with said driven pulley of said CVT.

7. A supercharger assembly comprising:
   a) a dry-running CVT including a drive pulley and a driven pulley connected by a belt, said pulleys and said belt contained within a CVT housing, said CVT housing having an opening formed therein providing access to a face of said driven pulley, said CVT housing further including a plurality of equally spaced bolt receivers arranged in a circle around said opening;
   b) a centrifugal supercharger having an impeller rotatably mounted within a supercharger housing;
   c) a gear assembly having an input connected to said driven pulley of said CVT, an output connected to said impeller of said supercharger, and a gear housing formed separate from said CVT housing, said gear housing having a plurality of bolt holes formed therein, said bolt holes arranged in a circle and alignable with respective ones of said bolt receivers in said CVT housing; and d) a plurality of fasteners, each said fastener receivable through a respective one of said bolt holes and into a respective one of said bolt receivers; wherein e) said gear housing is selectively rotatable relative to said CVT housing by moving each of said bolt holes from alignment with a first respective one of said bolt receivers and into alignment with a second respective one of said bolt receivers before installation of a respective one of said fasteners therein.

8. The supercharger assembly as in claim 7 wherein said gear assembly is a planetary gear assembly and includes a sun gear fixed to a sun gear shaft, a plurality of planet gears rotatably mounted on a rotatable planet gear carrier and a ring gear fixedly mounted within said gear housing, said planet gears being in toothed contact with said sun gear and said ring gear; and wherein a) said planet gear carrier is said input connected to said driven pulley of said CVT; and b) said sun gear shaft is said output connected to said supercharger impeller.

9. The supercharger assembly as in claim 8, wherein:

a) said driven pulley of said CVT has an axial recess formed therein;

b) an inner end of said sun gear shaft is supported by at least one bearing assembly mounted in said recess in said driven pulley; and c) said driven pulley and said sun gear shaft rotate in the same direction.

10. The supercharger assembly as in claim 9 wherein said bearing assembly includes an inner bearing race rotating with said sun gear shaft and an outer bearing race rotating with said driven pulley of said CVT.

11. A supercharger assembly comprising:

a) a dry-running CVT including a drive pulley and a driven pulley connected by a belt, said pulleys and said belt contained within a CVT housing, said CVT housing having an opening formed therein providing access to a face of said driven pulley, said CVT housing further including a plurality of equally spaced bolt receivers arranged in a circle around said opening;

b) a centrifugal supercharger having an impeller rotatably mounted within a supercharger housing;

c) a planetary gear assembly having a planet gear carrier thereof connected to said face of said driven pulley of said CVT, said planet gear carrier carrying a plurality of planet gears in toothed contact with a sun gear fixed to a sun gear shaft, said sun gear shaft connected to said impeller of said supercharger, and a gear housing formed separate from said CVT housing, said gear housing having a ring gear fixedly mounted therein in toothed contact with said planet gears, said CVT housing further including a plurality of bolt holes formed therein around said ring gear, said bolt holes arranged in a circle and alignable with respective ones of said bolt receivers; and d) a plurality of fasteners receivable through one of said bolt holes and into a respective one of said bolt receivers; wherein e) said gear housing is selectively rotatable relative to said cvt housing by moving each of said bolt holes from alignment with a first respective one of said bolt receivers and into alignment with a second respective one of said bolt receivers before installation of a respective one of said fasteners therein.

12. The supercharger assembly as in claim 11, wherein:

a) said driven pulley of said CVT has an axial recess formed therein;

b) an inner end of said sun gear shaft is supported by at least one bearing assembly mounted in said recess in said driven pulley; and c) said driven pulley and said sun gear shaft rotate in the same direction.

13. The supercharger assembly as in claim 12 wherein said bearing assembly includes an inner bearing race rotating with said sun gear shaft and an outer bearing race rotating with said driven pulley of said CVT.

14. A supercharger assembly comprising:

a) a dry-running CVT including a drive pulley and a driven pulley connected by a belt, said pulleys and said belt contained within a CVT housing, said CVT housing having an opening formed therein providing access to a face of said driven pulley;

b) a centrifugal supercharger having an impeller rotatably mounted within a supercharger housing;

c) a gear assembly having an input connected to said driven pulley of said CVT, an output connected to said impeller of said supercharger, and a gear housing formed separate from said CVT housing; and d) means for selectively rotatably connecting said gear housing to said CVT housing, said means for selectively rotatably connecting comprising:

i) a plurality of equally spaced bolt receivers arranged in a circle around said opening in said CVT housing;

ii) a plurality of bolt holes formed in said gear housing, said bolt holes arranged in a circle and alignable with respective ones of said bolt receivers in said CVT housing; and iii) a plurality of fasteners, each said fastener receivable through a respective one of said bolt holes and into a respective one of said bolt receivers; wherein iv) said gear housing is selectively rotatable relative to said CVT housing by moving each of said bolt holes from alignment with a first respective one of said bolt receivers and into alignment with a second respective one of said bolt receivers before installation of a respective one of said fasteners therein.

* * * * *